J. S. DRAKE.
Carriage and Sleigh.

No. 93,184.  Patented Aug. 3, 1869.

Witnesses
A Bennenendorf
Geo. W. Mace

Inventor
J. S. Drake
per Munn & Co
Attorneys

United States Patent Office.

JOHN S. DRAKE, OF NEW YORK, N. Y., ASSIGNOR TO HIMSELF AND WILLIAM H. BURTON, OF SAME PLACE.

Letters Patent No. 93,184, dated August 3, 1869.

IMPROVED CARRIAGE AND SLEIGH COMBINED.

The Schedule referred to in these Letters Patent and making part of the same.

*To all whom it may concern:*

Be it known that I, JOHN S. DRAKE, of New York City, in the county and State of New York, have invented a new and improved Combined Wagon and Sleigh; and I do hereby declare that the following is a full, clear, and exact description thereof, which will enable others skilled in the art to make and use the same, reference being had to the accompanying drawing, forming a part of this specification.

This invention relates to improvements in sleigh-attachments for wagons, whereby it is designed to provide a more simple and efficient arrangement of the same than any now in use.

The invention consists in so attaching a pair of "bob"-runners to each axle, that by a simple movement of a hand-lever, they may be turned down to the ground, and the wheels drawn thereupon, or, by the reverse movement when the wagon is being backed up, the said runners may be raised up in front of the wheels, out of action, where they may be secured.

Similar letters of reference indicate corresponding parts.

A pair of "bob"-runners, A, is journalled to each axle by boxes B, from which the arms C, connecting with the said runners, radiate, the said boxes being placed just inside of the wagon-wheels.

The rear ends of these runners are curved, to fit the periphery of the wheels of the wagon, as shown at E, and the runners are arranged in line with the wheels.

The runners of each pair are connected by shafts F, uniting the rear arms C, between the journal-boxes and the runners, and to the front shaft a lever is connected, by a link, H.

This lever rises up in front of the wagon, and is pivoted in a suitable bearing, I.

The shafts of the front and rear "bobs" are connected by a reach, K.

The lever G works to and fro in a slotted plate, L, on the platform, which plate is provided with a hinged locking-bar, M, which locks the said lever in two positions.

By means of this lever and the reach K, both pairs of "bobs" may be turned up or down on the axle, and they may be locked in the up or down position.

Figure 1:
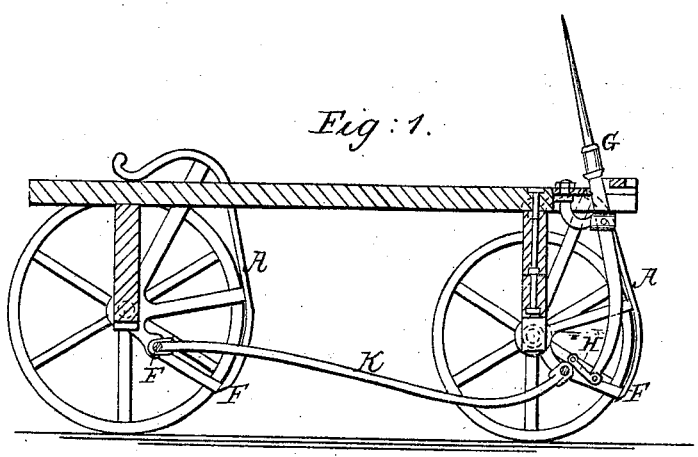
Figure 1 represents a longitudinal section of a wagon, with our improved sleigh-attachment applied to it.

In fig. 1 the runners are represented as in the position where they are supported when not required to be used by the lever G, which is locked behind the locking-bar M.

Figure 2:
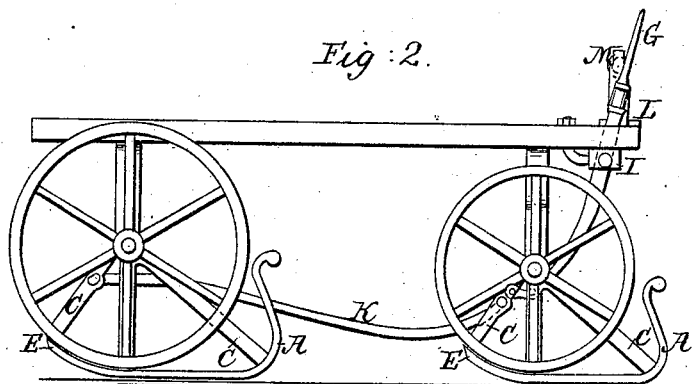
Figure 2 represents a side elevation.
Figure 3:
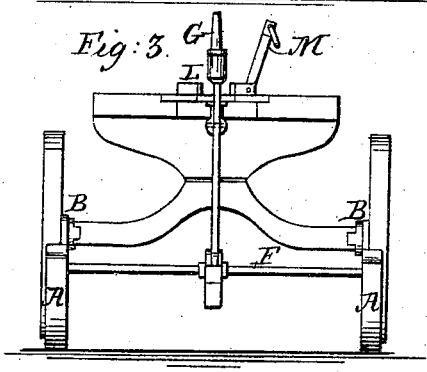
Figure 3 represents a front view.

For adjusting the runners under the wheels, as shown in fig. 2, the locking-bar M is raised, and the lever moved forward, and the runners thereby let fall, so that the curved ends will swing under the wheels, just in advance thereof, so that the forward movement of the wagon will cause the wheels to roll upon the said curved ends, causing them to roll until the flat part of the runners rest upon the ground. These flat parts prevent the further rolling, and the vehicle is then moved on the runners. The locking-bar M is then turned down behind the lever G, preventing the runners from being thrown up by a backward force on the vehicle.

For raising the said runners up, the lever is unlocked, and the vehicle backed, so as to cause the runners to roll up on the curved ends F, running them off the said curved ends; then, by pulling the lever back and locking it in that position, the said runners will be raised, and secured in the said position.

These runners may be used as brakes, as well as for runners upon the snow.

Any other preferred locking-device for the lever may be employed, and a similar lever may be applied to the rear runners, if preferred.

Having thus described my invention,

What I claim as new, and desire to secure by Letters Patent, is—

1. The combination, with the axles and wheels of a vehicle, of the bob-runners A, when journalled on the said axles, curved at the rear ends, and arranged relatively to the wheels, substantially as specified.

2. The combination, with the said "bob"-runners, of the lever G, reach K, and a locking-device for the said lever, substantially as specified.

JOHN S. DRAKE.

Witnesses:
FRANK BLOCKLEY,
ALEX. F. ROBERTS.